United States Patent [19]

Ohtake et al.

[11] Patent Number: 5,339,584
[45] Date of Patent: Aug. 23, 1994

[54] SYNTHETIC RESIN WINDOW FOR AUTOMOTIVE VEHICLES OR THE LIKE

[75] Inventors: Shinichi Ohtake; Tatsuya Tamura; Tetsuo Hotta; Takeshi Kashiwagi, all of Yokohama, Japan

[73] Assignee: Hashimoto Forming Industry Co., Ltd., Japan

[21] Appl. No.: 104,604

[22] Filed: Aug. 11, 1993

Related U.S. Application Data

[63] Continuation of Ser. No. 572,233, Aug. 24, 1990, abandoned.

[30] Foreign Application Priority Data

Aug. 31, 1989 [JP] Japan ................. 1-225675

[51] Int. Cl.$^5$ ............................. B06B 3/54; B60J 1/00
[52] U.S. Cl. .................................. 52/208; 296/84.1; 296/146.15; 296/200
[58] Field of Search .......... 52/208, 716.5, 397, 52/400; 296/84.1, 146

[56] References Cited

U.S. PATENT DOCUMENTS

| | | | |
|---|---|---|---|
| 1,976,773 | 10/1934 | Conway et al. | 52/208 |
| 2,733,789 | 2/1956 | Tolle | 52/400 |
| 3,093,217 | 7/1960 | Doede | 52/397 |
| 3,934,385 | 1/1976 | Paulus et al. | 52/717 |
| 3,968,612 | 7/1976 | Endo et al. | 52/400 |
| 4,200,681 | 4/1980 | Hall et al. | 427/45.1 |
| 4,700,525 | 10/1987 | Nieboer et al. | 52/208 X |
| 4,737,379 | 4/1988 | Hodgens et al. | 427/39 |
| 4,894,972 | 1/1990 | Endoh et al. | 52/716 |
| 5,197,243 | 3/1993 | Mozawa et al. | 52/208 |

FOREIGN PATENT DOCUMENTS

| | | |
|---|---|---|
| 0261661 | 3/1988 | European Pat. Off. . |
| 0371810 | 6/1990 | European Pat. Off. . |
| 1509421 | 7/1969 | Fed. Rep. of Germany . |
| 1659644 | 2/1974 | Fed. Rep. of Germany . |
| 3305257 | 8/1984 | Fed. Rep. of Germany . |
| 3841233 | 7/1989 | Fed. Rep. of Germany . |
| 1520125 | of 1967 | France . |
| 61-32808 | 2/1986 | Japan . |
| 62-251229 | 11/1987 | Japan . |
| 1144099 | 3/1969 | United Kingdom . |
| 2215717 | 9/1989 | United Kingdom . |

*Primary Examiner*—Carl D. Friedman
*Assistant Examiner*—Robert J. Canfield
*Attorney, Agent, or Firm*—Stevens, Davis, Miller & Mosher

[57] ABSTRACT

A synthetic resin window, e.g. for automotive vehicles, includes a window body member in the form of a sheet of transparent or semi-transparent synthetic resin, a hard coated layer covering and fusion-bonded to at the outer surface of the window body member, a frame member of a synthetic resin formed integrally with the body member to extend along a peripheral edge thereof, and connection between the frame member and the outer surface of the window body member. The connection may include a core element which is integrally connected to the window body member in a form-locking manner from outer and inner sides thereof, and at least partly embedded in said frame member. Alternatively, the connection may include bare surfaces of the synthetic resin forming the window body member, which are not covered by the hard coated layer and which are directly adhered to the frame member by an adhesive agent.

14 Claims, 9 Drawing Sheets

FIG_7

FIG_8

FIG_9

FIG_10

FIG_11

FIG. 13

FIG_14

FIG_15

FIG_16

FIG_17

SYNTHETIC RESIN WINDOW FOR AUTOMOTIVE VEHICLES OR THE LIKE

This application is a continuation of application Ser. No. 07/572,233, filed Aug. 24, 1990 now abandoned.

BACKGROUND OF THE INVENTION

1. Field of the Invention

The present invention relates to a window made of synthetic resin, and more particularly to a synthetic resin window which is suitable for automotive vehicles or the like.

2. Description of the Related Art

A synthetic resin window for automotive vehicles is disclosed, e.g., in Japanese Utility Model Application Publication No. 61-32,808, as being manufactured by an injection molding process. The known synthetic resin window generally includes a window body member of transparent or semi-transparent synthetic resin, such as polycarbonate or acrylic resin, as well as a frame member extending along the peripheral edge of the body member and formed into a predetermined shape which corresponds to flange of a relevant vehicle body panel. Due to susceptibility of the synthetic resin to scratches or the like damages, the outer surface of the window body member is generally covered by a hard coated film layer, while the outer surface of the frame member has a paint applied thereto and is an opaque coated layer of a desired color.

In this connection, Japanese Patent Application Laid-open Publication No. 63-137,017 discloses a process wherein a resin film formed with a hard coated layer thereon is inserted into the cavity of an injection mold, and a transparent synthetic resin is subsequently injected into the cavity such that the resin film is fusion-bonded to a sheet of the injected resin obtained after it has been subjected to cooling and curing. In this case, the resin film completely covers the entire surface of the window body member. Furthermore, Japanese Patent Application Laid-open Publication Nos. 63-159,126; and 63-159,127 each discloses a process wherein a hard coated layer is formed on the surface of the window body member, and the window body member is subsequently placed into the cavity of an injection mold to integrally form the frame member along the peripheral edge of the window body member.

The abovementioned known synthetic resin window proved to be advantageous particularly in its reduced weight, but suffers from a problem of significantly low rigidity as compared with conventional inorganic glass windows. Thus, the synthetic resin window as mounted on the vehicle body panel often exhibits undesirable deformation or damage as a result of fastening force or the like. The required rigidity of the synthetic resin window might be realized either by increasing the thickness of the window body portion itself, or by providing reinforcing ribs on the frame portion. However, these solutions are not very suitable from practical viewpoints that an increased thickness of the window body portion would make it almost impossible to achieve a reduced weight of the window as a whole, while a provision for reinforcing ribs on the frame portion more or less results in formation of undesirable sink mark on the outer surface of the frame portion to significantly deteriorate the appearance.

Moreover, the hard coated layer on the window main body member tends to be readily separated due to deformation or damage as a result of insufficient rigidity of the window. Also, even when the hard coated layer is formed on a primer layer, the hard coated layer is not maintained in good adhesion with plasticized synthetic resin forming the frame member, e.g. polyvinylchloride resin or polyurethane resin, so that the frame member tends to be readily separated from the window body member. Besides, the application of paint to the frame member to form the opaque layer makes it difficult to simplify the manufacturing steps.

SUMMARY OF THE INVENTION

Therefore, it is a primary object of the present invention to eliminate the drawbacks of conventional arrangements, and provide an improved synthetic resin window which is light in weight and rigid enough to prevent any deformation or damages to the window as mounted in place.

Another object of the present invention is to provide an improved synthetic resin window which is excellent in weatherability and chemical resistance, and which is capable of maintaining the hard coated layer and/or frame member in good adhesion with the window body member, thereby effectively preventing separation of the hard coated layer and/or frame member from the window body member.

To this end, according to the present invention, there is provided a synthetic resin window for automotive vehicles or the like, comprising: a window body member in the form of a sheet of transparent or semi-transparent synthetic resin; a hard coated layer covering and fusion-bonded to at least a substantial part of at least outer surface of said window body member; a frame member of a synthetic resin formed integrally with said body member to extend along a peripheral edge thereof; and a connection means arranged between said frame member and outer surface of said window body member.

The synthetic resin window according to the present invention is provided with a hard coated layer covering and fusion-bonded to the outer surface of the window body member, and optionally formed on its inner surface also, to realize a satisfactory scratch-proof characteristic of the window body member as well as improved weatherability and chemical resistance. Moreover, the positive connection between the frame member and outer and inner surfaces of the window body member makes it possible to maintain the hard coated layer and/or frame member in good adhesion with the window body member, and to thereby effectively prevent separation of the hard coated layer and/or frame member from the window body member.

There are many possibilities in realizing a connection between the frame member and outer surface of the window body member. For example, the connection may be achieved by a core element which is integrally connected to the window body member in a form-locking manner from outer and inner sides thereof, and embedded at least partly in said frame member. The core element can be readily and stably maintained in integral connection with the hard coated layer and also with the frame member, and serves to effectively reinforce the window as a whole and improve the mechanical strength of the window, such as bending strength, fracture strength, impact strength. Because the core element is embedded at least partly in the frame member, even in the event that the frame member is not maintained in good adhesion with the hard coated layer, the frame member is stably retained by the core element integrally connected to the window body member in a form-locking manner.

In a window including a hard inorganic glass plate, it is known to integrally form along the peripheral edge of the glass plate a synthetic resin frame member (or a molding member) in which a profiled metal core element is embedded, as disclosed, e.g., in Japanese Patent Application Laid-open Publication Nos. 57-1,737; 58-73,681; 61-283,515; and 63-283,917. However, the core element of such an arrangement serves to reinforce the frame member itself, not the window body member, and is not applicable to a synthetic resin window since it is not maintained in good adhesion with the window body member which is formed with a hard coated layer thereon.

The connection of the window body member, frame member and core element with each other can be further improved when the core element is formed with openings through which the synthetic resin forming the frame member is bonded with the window body member, when the core element has projections which are pressed into the window body member, and/or when the core element is secured to the frame member by an adhesive agent.

Furthermore, when the core element is partly exposed from the frame member, it is possible to readily provide an aesthetically refined appearance of the window.

As an alternative possibility, the connection between the frame member and outer surface of the window body member may include bare surfaces of the synthetic resin forming the window body member, which are not covered by the hard coated layer and which are directly adhered to the frame member by an adhesive agent. In this case, the frame member directly adhered to the bare surfaces of the window body member which are not covered by the hard coated layer can be retained in place in a stable manner, with a minimized risk of its separation. For maintaining a good adhesion of the hard coated layer with the surface of the window body member, the frame member may extend to cover the end region of the hard coated layer on the outer surface of the window body member.

The window wherein the frame member is directly adhered to the bare surfaces of the window body member can be manufactured by a process including the step of: inserting into the cavity of a first injection mold a resin film which is formed with a hard coated surface layer and which is smaller in size than the cavity, and injecting into the cavity of the first injection mold a transparent or semi-transparent synthetic resin to form a sheet-like window body member with its surface fusion-bonded with the resin film; placing the peripheral edge of the window body member into the cavity of a second injection mold, and injecting into the cavity of a second injection mold another synthetic resin to form a frame member which is integral with the window body member as being adhered to the bare surfaces of the window body member.

Finally, in carrying out the present invention, the hard coated layer may include a SiOx film layer which may be formed by a plasma-enhanced chemical vapour deposition process.

DETAILED DESCRIPTION OF THE INVENTION

The present invention will be explained below with reference to some preferred embodiments shown in the drawings.

Figure 1:
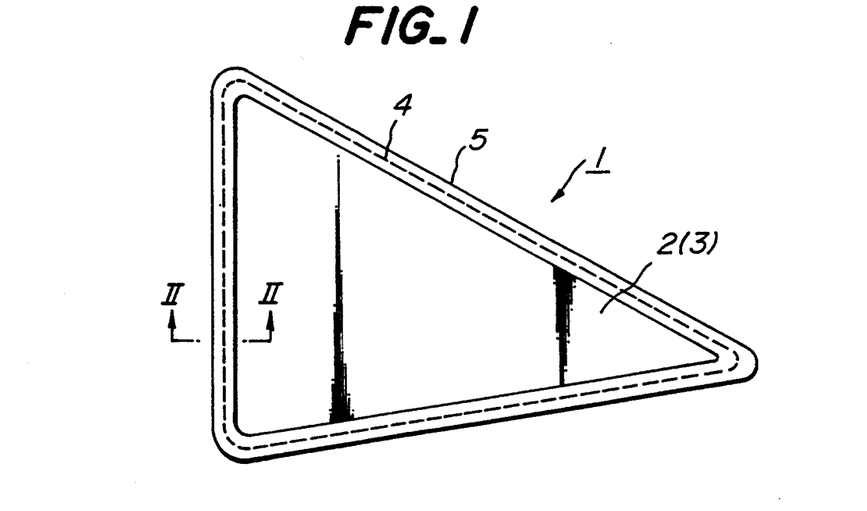
FIG. 1 is a front view of a side window for an automotive vehicle according to one preferred embodiment of the invention.

Referring now to FIG. 1, there is shown a synthetic resin side window according to one embodiment of the present invention, which is for an automotive vehicle. The window is designated by reference numeral 1, and is made substantially of appropriate synthetic resin by means of an injection molding process, and secured to a relevant vehicle body panel.

The window 1 includes a window body member 2 in the form of a sheet of transparent or semi-transparent synthetic resin, such as polycarbonate resin, polymethyl methacrylate resin or the like. The window body member 2 has an outer surface which is formed with a hard coated film layer 3 to be explained hereinafter, as well as a peripheral edge which is surrounded by a reinforcing core element 4 of an elongate profiled metal body with a substantially U-shaped cross-section. The core element 4 may be formed of a strip of stainless steel, aluminum or other appropriate material, which has been subjected to bending and press-shaping by means of a a roll forming operation. The core element 4 is integrally connected to the window body member 2 in a form-locking manner from outer and inner sides thereof. More particularly, the core element 4 is substantially "U" shaped having first and second legs and a "U" shaped bight portion therebetween and is provided with a number of local projections 4a, on the legs, on the bight or on both which are pressed into the outer and inner surfaces of the window body member 2. The window 1 further includes a synthetic resin frame member 5 extending along the peripheral edge of the window body member 2. The frame member 5 is formed integrally with the window body member 2 by an injection molding process, such that the core element 4 is at least partly embedded in the frame member 5.

Figure 2:
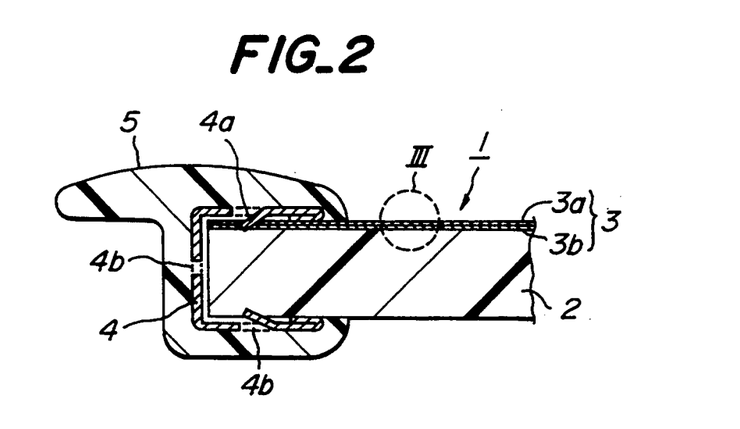
FIG. 2 is a cross-sectional view taken along the line II—II of FIG. 1.
Figure 3:
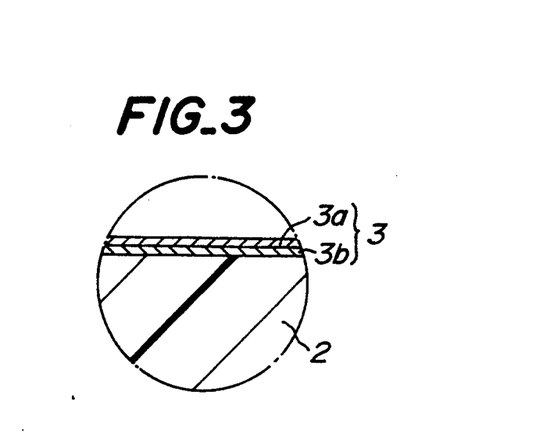
FIG. 3 is a cross-sectional view in an enlarged scale, showing the hard coated layer in the region III in FIG. 2.

As particularly shown in FIGS. 2 and 3, the hard coated layer 3 may be formed of a plurality of sub-layers which are laminated with each other after formation of the window body member 2 by an injection molding process. That is, the window body member 2 is subjected to appropriate surface treatment to form on its outer surface a hard coated sub-layer 3b consisting, for example, of a siloxane- or acryl-based resin or a UV curing-type resin. The hard coated sub-layer 3b is then covered by a SiOx sub-layer 3a. If necessary, a primer sub-layer may be interposed between the outer surface of the window body member 2 and the hard coated sub-layer 3b.

Figure 4:
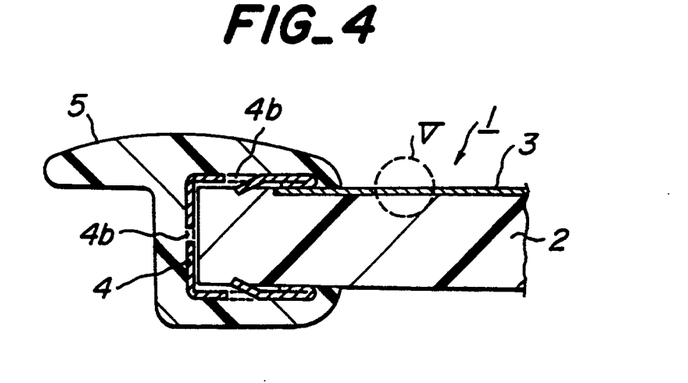
FIG. 4 is a cross-sectional view similar to FIG. 2, showing a modified embodiment of the hard coated layer according to the present invention.
Figure 5:
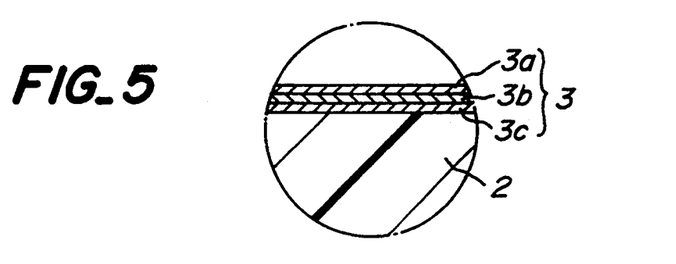
FIG. 5 is a cross-sectional view similar to FIG. 3, showing the hard coated layer in the region V in FIG. 4.

In a modified embodiment shown in FIGS. 4 and 5, the hard coated layer 3 is prepared prior to the formation of the window body member 2. In this case, the hard coated layer 3 further includes a sub-layer 3c in the form of synthetic resin film having a sufficient compatibility with the synthetic resin forming the window body member 2. The hard coated layer 3 including the sub-layers 3a, 3b, 3c is inserted into the cavity of an injection mold for molding the window body member 2, before injection of the resin into the mold cavity. After injecting the resin into the mold cavity and subjecting the injected resin to cooling and curing, a window body member 2 can be obtained including an outer surface to which the synthetic resin sub-layer 3c is fusion-bonded.

The frame member 5 is composed of appropriate thermoplastic synthetic resin, such as polyvinyl chloride resin, polyvinyl acetate resin, ethylenevinyl acetate resin, ionomer resin, etc, and is more resilient and/or flexible as compared with the window body member 2. The frame member 5 may be formed by a process including application of an adhesive agent to the outer surface of the core element 4, subsequently placing the peripheral edge of the window body member 2 into the cavity of another injection mold, injecting the thermoplastic synthetic resin into the mold cavity, and subjecting the injected resin to cooling and curing. By this, the frame member 5 is formed which is integrally connected to the peripheral edge of the window body member 2 with the core element 4 embedded therein.

Figure 6:
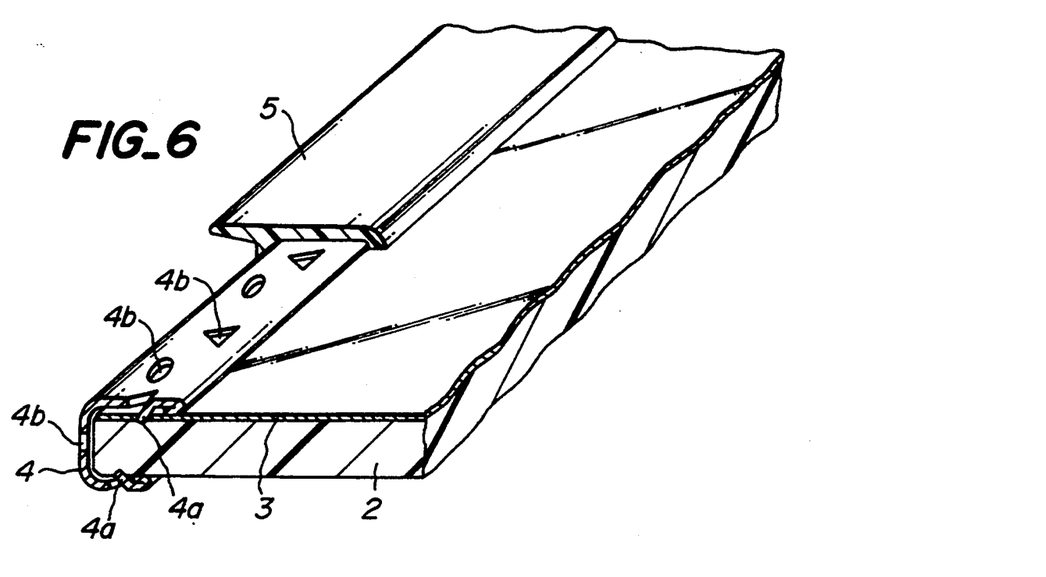
FIG. 6 is a perspective view the side window according to the embodiment shown in FIG. 1.

In this connection, as particularly shown in FIG. 6, the core element 4 may be formed with a number of openings 4b, some of which are obtained by providing the projections 4a by means of stamping or the like, through which openings the resin forming the frame member 5 is directly and integrally connected to the window body member 2.

In the synthetic resin window 1 according to the abovementioned embodiment, the hard coated layer 3 covering and fusion-bonded to the outer surface of the window body member 2 serves to realize satisfactory scratch-proof characteristics and improved weatherability and chemical resistance of the window body member 2. The positive connection between the frame member 5 and the outer and inner surfaces of the window body member 2, in the form of a profiled core element 4, makes it possible to maintain the hard coated layer 3 and frame member 5 in good adhesion with the window body member 2, to effectively prevent separation of the hard coated layer 3 or frame member 5 from the window body member 2.

The core element 4 can be readily and stably maintained in integral connection with the hard coated layer 3 and also with the frame member 5, and serves to effectively reinforce the window 2 as a whole and improve the mechanical strength of the window, such as bending strength, fracture strength, impact strength. Because the core element 4 is embedded in the frame member 5, the frame member 5 is stably retained by the core element 4 which is integrally connected to the window body member in a form-locking manner.

Moreover, due to the arrangement wherein the core element 4 has projections 4a which are pressed into the window body member 2 from outer and inner sides thereof, while the core element 4 is formed with openings 4b through which the synthetic resin forming the frame member 5 is bonded with the window body member 2, and wherein the core element 4 is secured to the frame member 2 by an adhesive agent, it is possible to achieve and maintain a stable integral connection of the window body member 2, the core element 4 and the frame member 5 with each other.

It is of course that various modifications may be made to the abovementioned embodiment, as discussed below with reference to FIGS. 7–9 by way of examples only.

Figure 7:
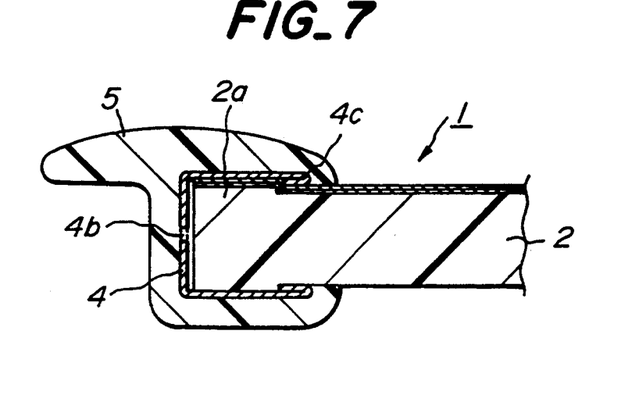
FIGS. 7–9 are cross-sectionals view similar to FIG. 2, showing different examples of the window according to the embodiment shown in FIG. 1, respectively.

First of all, in the example shown in FIG. 7, the window body member 2 is provided with a peripheral edge 2a of an increased thickness as compared with remaining regions thereof, while the core element 4 has its free edges 4c folded rearwardly toward the base of U of its cross-section such that the folded free edges 4c of the core element 4 are brought into mechanical engagement with and behind shoulders which are formed between the relatively thick peripheral edge 2a and the remaining regions of the window body member 2.

Figure 8:
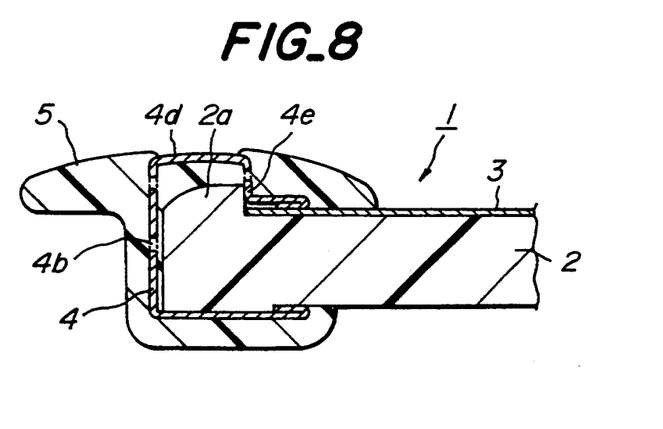

In another example shown in FIG. 8, the core element 4 includes an ornamental portion 4d which is exposed from the frame member 5 and visible from outside. The ornamental portion provides an aesthetically refined appearance of the window 1, particularly when it is of a color different from that of the frame member 5. Moreover, the ornamental portion 4d is continuous with an upright portion 4e which also is brought into mechanical engagement with and behind a shoulder between the relatively thick peripheral edge 2a and the remaining regions of the window body member 2.

Figure 9:
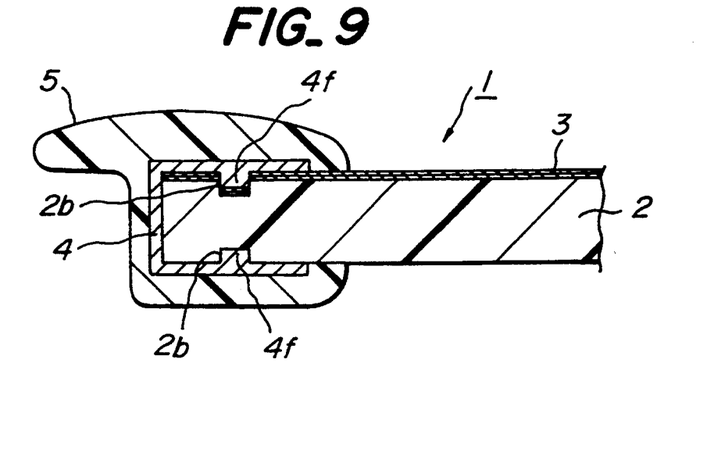

In still another example shown in FIG. 9, the core element 4 is formed into an integral body of a hard synthetic resin, such as fiber-reinforced plastics, and includes projections 4f which are brought into engagement with corresponding recesses 2b in the window body member 2 to improve the integral connection between the window body member 2 and the frame member 5.

Furthermore, although not shown in the drawings, the hard coated layer 3 may also be formed on the inner surface of the window body member 2, while the core element 4 or the frame member 5 needs not extend along the entire peripheral edge of the window body member 2.

Figure 10:
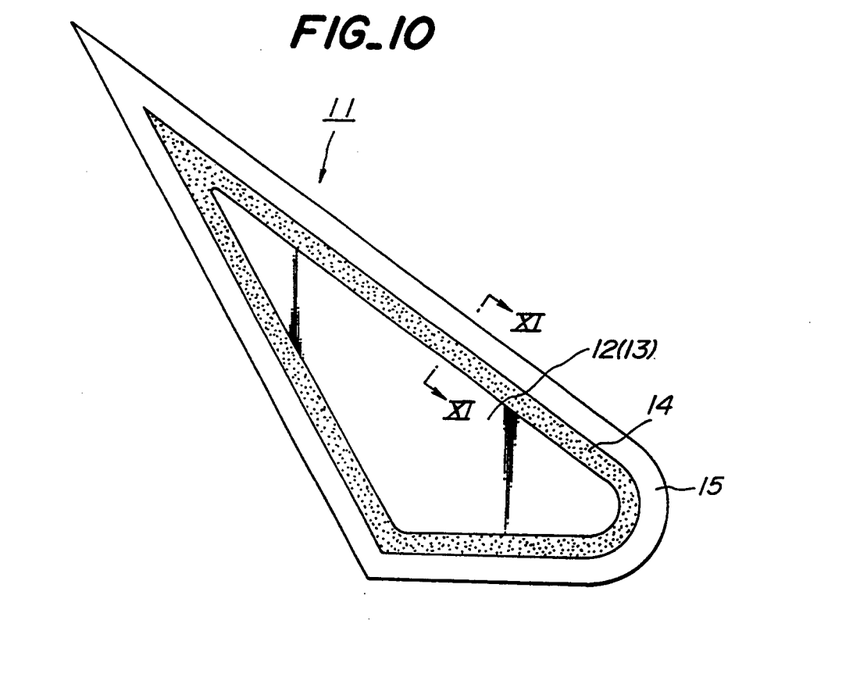
FIG. 10 is a front view of a side window for an automotive vehicle according to another preferred embodiment of the invention.
Figure 11:
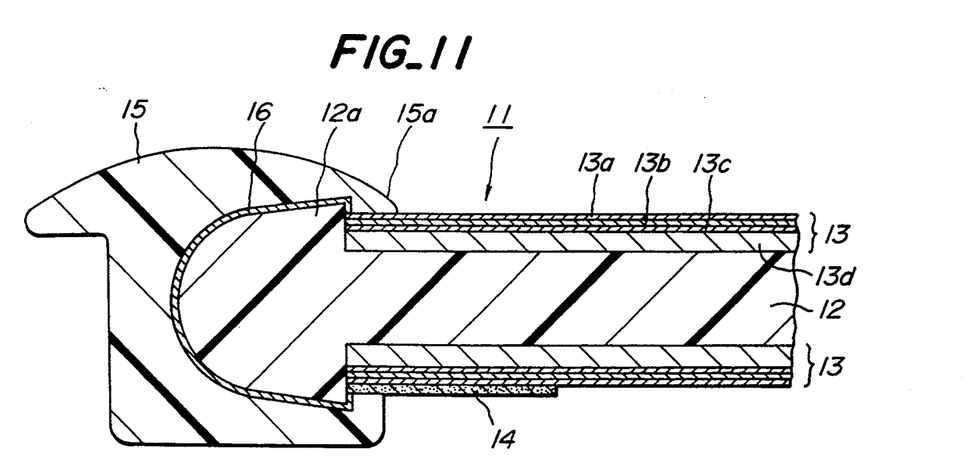
FIG. 11 is a cross-sectional view taken along the line XI—XI of FIG. 10.

Referring now to FIGS. 10 and 11, there is shown a synthetic resin side window according to another preferred embodiment of the present invention, which is for an automotive vehicle. The window is designated by reference numeral 11, and is made as a whole of appropriate synthetic resin by means of an injection molding process, and secured to a relevant vehicle body panel.

The window 11 includes a window body member 12 in the form of a sheet of transparent or semi-transparent synthetic resin, such as polycarbonate resin, polymethyl methacrylate resin or the like. The window body member 12 has an outer surface which is formed with a hard coated film layer 13 including sub-layers 13a, 13b to be explained hereinafter, an inner surface which is formed with a colored opaque layer 14, as well as a peripheral edge 12a which is left uncovered by the hard coated layer 13 or the opaque layer 14 to expose bare surfaces of the synthetic resin on its outer and inner sides. The window 11 further includes a synthetic resin frame member 15 extending along the peripheral edge of the window body member 2. The frame member 15 is formed integrally with the window body member 12 by injection molding process, and is adhered to the bare surfaces of the window body member 12 on its peripheral edge by means of an adhesive agent 16, if necessary.

As clearly shown in FIG. 11, the hard coated layer 13 may be formed of a plurality of sub-layers 13a–13d which are laminated with each other. More particularly, the window body member 12 is formed on its outer surface with a base film sub-layer 13d of a transparent resin having a sufficient compatibility with the resin of the window body member 12, such as polycarbonate resin, polymethyl methacrylate resin or the like. The base film sub-layer 13d is covered by a hard coated sub-layer 13b consisting e.g. of a siloxane-based resin, with a primer sub-layer 13c interposed therebetween, if necessary. The hard coated sub-layer 13b, in turn, is covered by another hard coated sub-layer 13a of a SiOx film which may be formed by PVD- or CVD--process in a manner known, per se. The primer sub-layer 13c is composed of appropriate material which is suitable for adhering the hard coated sub-layers 13a, 13b to the base film sub-layer 13d, and may be omitted when the base film sub-layer 13d is composed of a polymethyl methacrylate resin.

One of the hard coated sub-layers 13a, 13b may be omitted, if necessary, though the combination of the sub-layers 13a–13d laminated in the abovementioned sequence proved to effectively provide satisfactory functional advantages. Furthermore, the hard coated layer 13 may be formed on the inner surface of the window body member 12 also, as shown in FIG. 11.

Preferably, the peripheral edge 12a of the window body member 12 with the bare surfaces on its outer and inner sides has an increased thickness as compared to the remaining regions of the window body member 12, such that shoulders are formed by the relatively thick peripheral edge 12a of the window body member 12 along its junction with the remaining regions, and these shoulders are brought into abutment with the edge of the hard coated layer 13.

The frame member 15 is composed of appropriate synthetic resin, such as plasticized polyvinyl chloride resin, polyurethane resin, etc, and is more resilient and-/or flexible as compared with the window body member 2. When the synthetic resin of the frame member 15 exhibits an excellent compatibility to that of the window body member 12, e.g. plasticized polyvinyl chloride resin for the window body member 12 of polycarbonate resin or polymethyl methacrylate resin, the frame member 15 can be directly adhered to the bare surfaces of the peripheral edge 12a of the window body member 12. On the other hand, when the synthetic resin of the frame member 15 exhibits a poor compatibility to that of the window body member 12, e.g. polyurethane resin for the window body member 12 of polycarbonate resin or polymethyl methacrylate resin, the frame member 15 can be adhered to the bare surfaces of the peripheral edge 12a of the window body member 12 by using an appropriate adhesive agent. For maintaining a good adhesion of the hard coated layers 13 with the outer and inner surfaces of the window body member 12, the frame member 15 preferably extends inwardly beyond the relatively thick peripheral edge 12a of the window body member, to cover and tightly contact with the edge regions of the hard coated layers 13 on both surfaces of the window body member 12.

Figure 12:
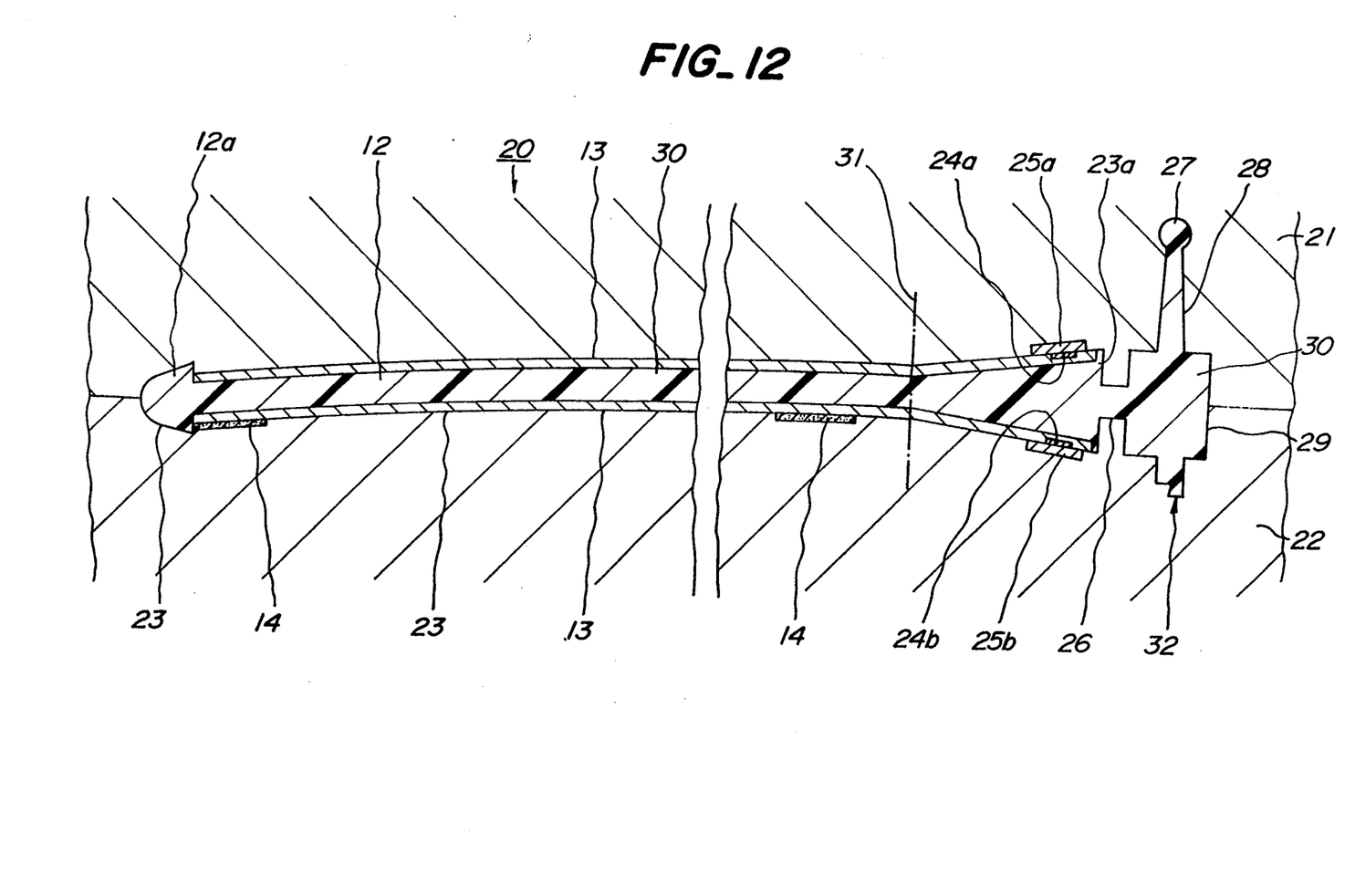
FIG. 12 is a cross-sectional view showing the step of molding the window body member shown in FIGS. 10 and 11 and taken along the line XII—XII of FIG. 13.

The window according to the embodiment shown in FIGS. 10 and 11 can be manufactured by a process to be particularly explained below. As shown in FIG. 12, the process makes use of an injection molding device 20 which includes a cavity mold 21 and a core mold 22 defining a mold cavity 23 which corresponds in shape to the window body member 11. There is prepared a laminated film 13 corresponding to the hard coated layer, having one end region in which is embedded a magnetic strip 24a, 24b. Two sheets of laminated films 13 are inserted into the mold cavity 23 such that they are maintained in contact with inner surfaces of the cavity mold 21 and the core mold 22, respectively. The cavity mold 21 and the core mold 22 are each provided with a magnet 25a, 25b embedded therein, and the two sheets of laminated films 13 are positioned so that their magnetic strips 24a, 24b are attracted by the magnets 25a, 25b, respectively. The magnets 25a, 25b are arranged close to gate 26 of the mold 20, and the distance between inner surfaces of the cavity plate 21 and the core plate 22 in the resin inlet region 23a of the mold cavity 23 is increased toward the gate 26 in order to prevent the end regions of the laminated films 13 from being directly opposed to the gate 26.

The injection molding device 20 further includes a runner 27, a sprue 28 and a resin pool 29, through which a transparent resin 30 in its molten state is injected into the mold cavity 23 whereby the resin 30 is filled within the mold cavity 23, urging the laminated films 13 against the inner surfaces of the cavity plate 21 and the core plate 22. The injected resin 30 is then subjected to cooling and curing, to form a window body member 12 wherein the base film sub-layers 13d of the laminated films 13 are integrally fusion-bonded to the respective surfaces of the window body member 12.

Figure 13:
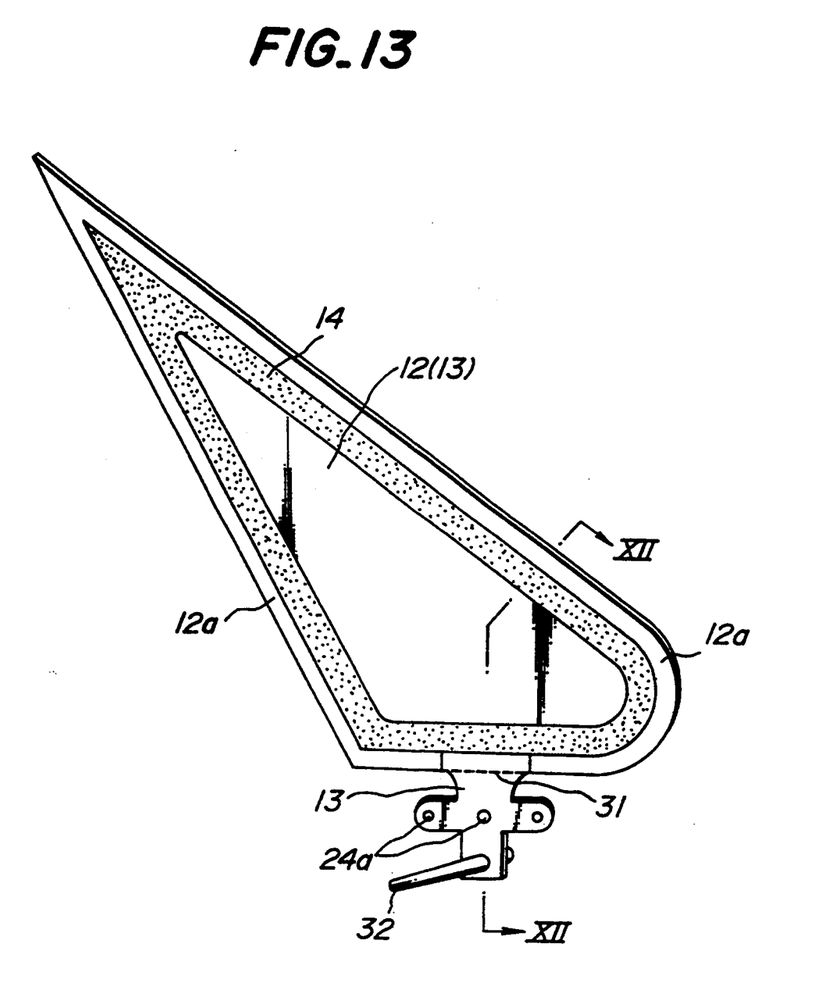
FIG. 13 is a perspective view showing the window body member as molded.

The window body member 12 so obtained is shown in FIG. 13, and is subjected to cutting along a predetermined cutting line 31 to remove unnecessary material in the resin inlet region 32.

Figure 14:
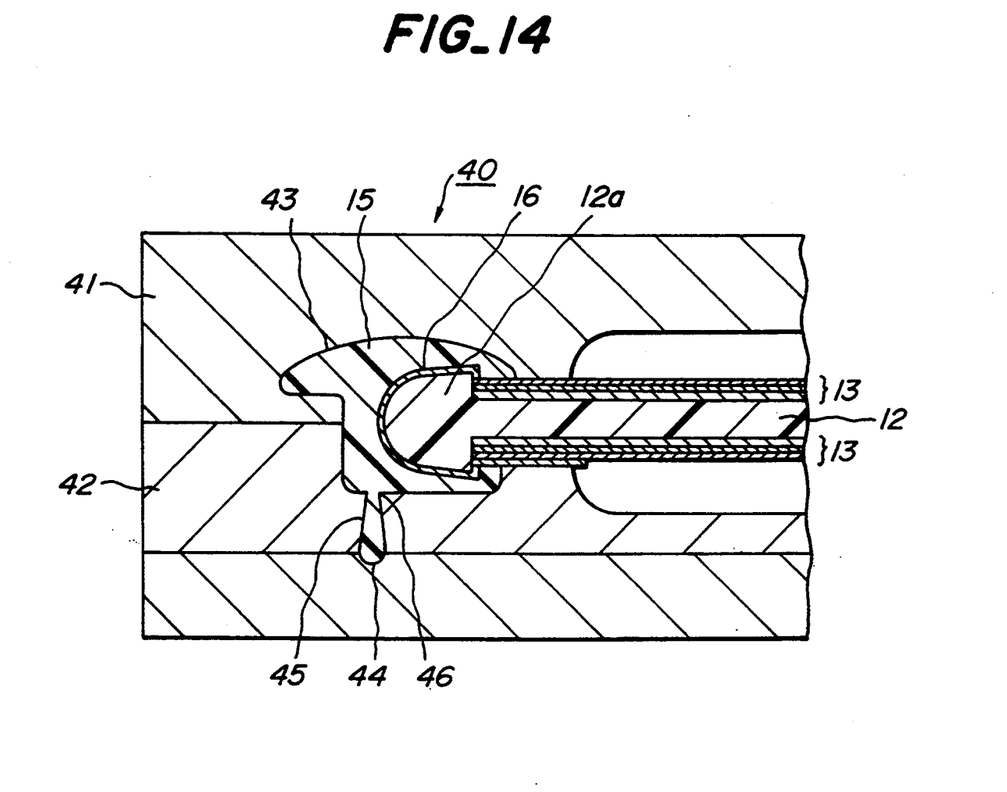
FIG. 14 is a cross-sectional view showing the step of molding the frame member shown in FIGS. 10 and 11.

In a subsequent frame formation step, as shown in FIG. 14, use is made of another injection mold 40 which includes a cavity mold 41 and a core mold 42 defining a mold cavity 43. The peripheral edge of the window body member 12 with bare surfaces of the resin is inserted into the mold cavity 43 and the cavity mold 41 and the core mold 42 are clamped with each other. If necessary, the peripheral edge of the window body member 12 is applied with an adhesive agent 16 before it is inserted into the mold cavity 43. The injection mold 40 further includes a runner 44, a sprue 45 and a gate 46, through which different resin 47 in its molten state is injected into the mold cavity 43 to form a frame member 15 which is directly and integrally connected to the peripheral edge of the window body member 12.

Incidentally, the colored opaque layer 14 is preferably formed in advance, e.g. by applying acryl silicate-based paint to the resin film layer 13 and subsequently injecting the resin to form the window body member 12 and integrally fusion-bonding the film layer 13 to the surface of the window body member 12, though it may be formed by applying a paint to the window body member 12 after it has been molded.

Furthermore, although not shown in the drawings, the hard coated layer 13 on the inner surface of the window body member 12 may be omitted, and the frame member 15 need not extend along the entire peripheral edge of the window body member 12.

In the synthetic resin window 11 according to the abovementioned embodiment, the hard coated layers 13 covering and fusion-bonded to the outer and inner surfaces of the window body member 12 serve to realize satisfactory scratch-proof characteristic and improved weatherability and chemical resistance of the window body member 12. The positive connection between the frame member 15 and the outer and inner surfaces of the window body member 12, i.e. the direct adhesion of the frame member 15 and the bare surfaces on outer and inner sides of the window body member 12, makes it possible to maintain the hard coated layer 13 and frame member 15 in good adhesion with the window body member 12, and effectively prevents separation of the hard coated layer 13 or frame member 15 from the window body member 12.

The hard coated layer 3, 13 in the window according to the abovementioned embodiments can be formed by various methods, such as PVD- or CVD-process as explained hereinbefore. One efficient method, however, is a so-called plasma-enhanced CVD process using a high frequency magnetron cathode, wherein plasma is confined by magnetic field to achieve a higher plasma density, while high frequency voltage is applied to excite the molecules themselves and thereby promote decomposition of gas.

In this case, one preferred reaction to be applied is shown by following formula (1):

$$SiH_4 + 4N_2O \rightarrow SiO_2 + 2H_2O + 4N_2 \qquad (1)$$

Alternative reactions are shown by following formulae (2) to (5):

$$Si(OC_2)_4 \rightarrow SiO_2 + 4C_2H_4 + 2H_2O \qquad (2)$$

$$Si_4 + 5CO_2 + H_2 \rightarrow SiO_2 + 5CO + 3H_2O \qquad (3)$$

$$SiH_2Cl_2 + 2N_2O \rightarrow SiO_2 + 2HCl + 2N_2 \qquad (4)$$

$$SiH_4 + 2O_2 \rightarrow SiO_2 + 2H_2O \qquad (5)$$

Figure 15:
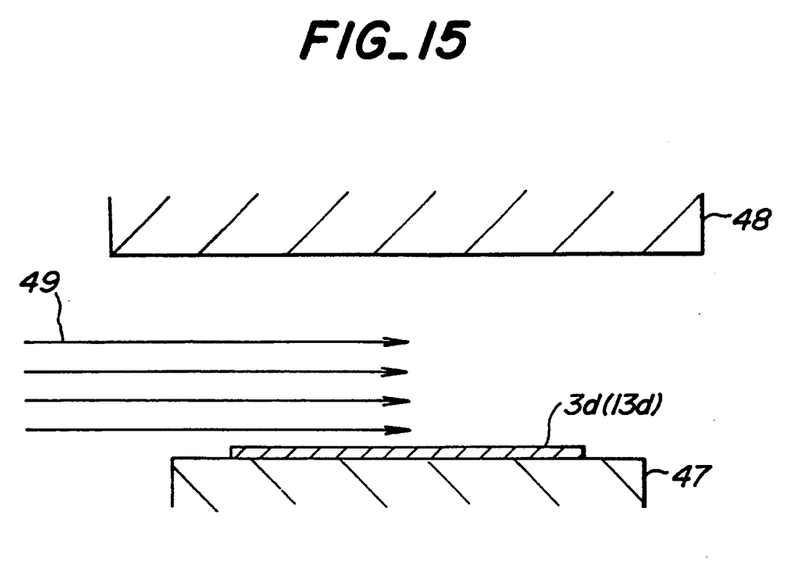
FIG. 15 is a schematic view explaining the step of forming the SiOx sub-layer of the hard coated layer in the window according to the present invention.
Figure 16:
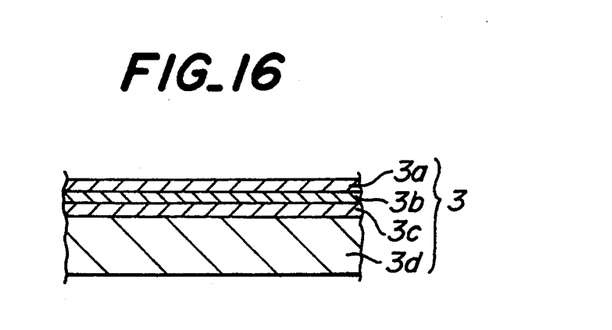
FIG. 16 is a cross-sectional view showing the hard coated layer which has been formed by the step of FIG. 15.

More particularly, a flexible and transparent resin film 3d (or 13d) is applied on its one surface with a primer sub-layer 3c and/or siloxane-based hard coated sub-layer 3b, if necessary, and is subsequently formed with SiOx film sub-layer 3a by plasma-enhanced CVD process. To this end, as shown in FIG. 15, the resin film 3d is placed on a carrier 47 and moved to a position where the film 3d is opposed to a high frequency magnetron cathode 48 within a vacuum chamber (not shown) and the carrier 47 is electrically connected to ground. The pressure in the vacuum chamber is reduced to, and maintained at approximately 10 to $10^{-3}$ Torr, preferably on the order of $10^{31\ 2}$ Torr. While injecting a small amount of Ar or $N_2$ gas 49 into the vacuum chamber, the cathode 48 is applied with a high frequency voltage on the order of 10–20 MHz to generate gas plasma in a space between the film 3d and the cathode 48. On this occasion, the outer surface of the film 3d is subjected to bombardment by the plasma of Ar or $N_2$ gas 49, while improving the flatness of the outer surface at the same time. Supply of the Ar or $N_2$ gas 49 is then stopped, and the vacuum chamber is now supplied with a mixture gas in which $SiH_4$ gas and $N_2O$ gas are mixed with each other at a ratio of substantially 1:1 to generate plasma, whereby the mixture gas undergoes a chemical reaction to form a SiOx film 3a on the resin film 3d to finish the hard coated resin film layer 3 (or 13).

Figure 17:
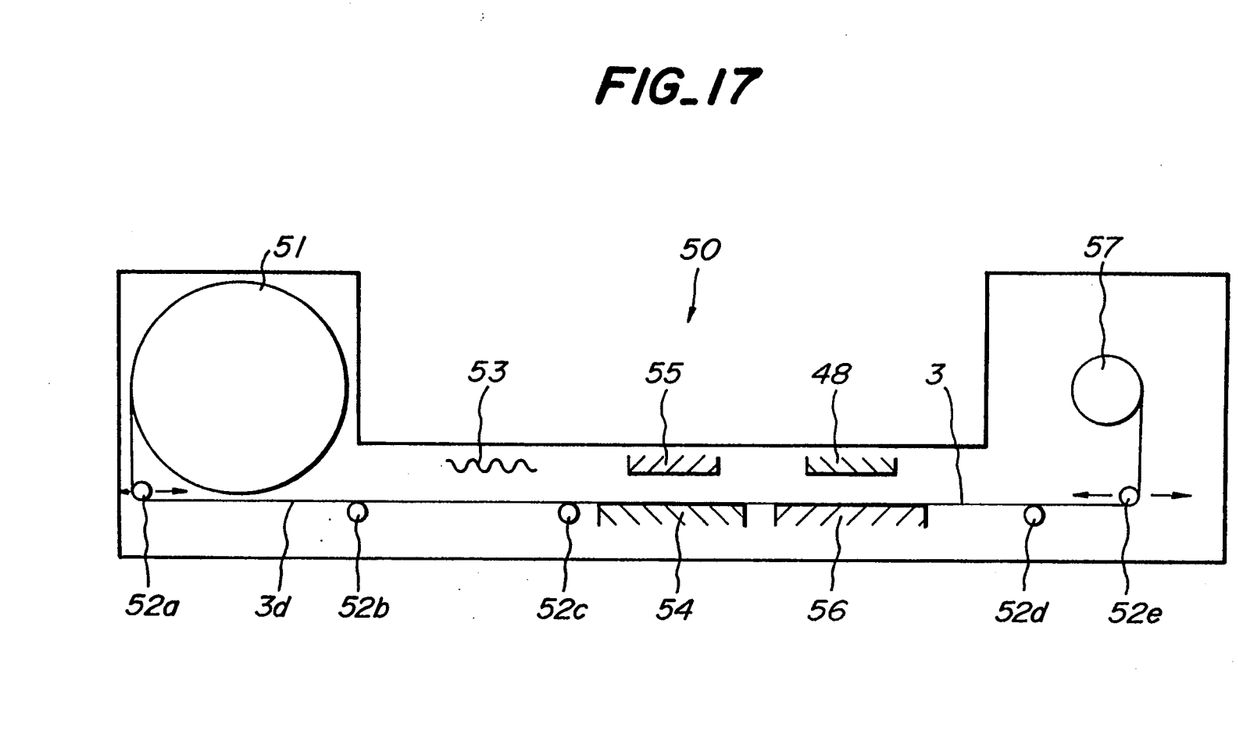
FIG. 17 is a schematic view showing the device for forming the SiOx sub-layer of the hard coated layer.

There is shown in FIG. 17 one example of a device for continuously forming the hard coated resin film layer 3 (or 13). The device is designated as a whole by reference numeral 50, and includes a supply roll 51 for supplying the resin film 3d. The resin film 3d is continuously unwound from the roll 51 and passed through rollers 52a–52e while it is heated by heater 53, and subjected to bombardment (purification) on a stationary earth member 54 by applying a high frequency voltage to a cathode 55 and generating plasma in a space between the resin film 3d and the cathode 55. Subsequently, the resin film 3d is formed with SiOx film layer 3a by plasma-enhanced CVD process on another stationary earth member 56 by applying a high frequency voltage to a cathode 48 and generating plasma in a space between the resin film 3d and the cathode 48. The hard coated resin film 3 so obtained is wound onto a winding roll 57, and is subjected to trimming into a necessary configuration corresponding to the window body member, before the resin film 3 is inserted into the mold cavity.

The abovementioned plasma-enhanced CVD process is capable of uniformly forming the SiOx film at relatively high speed and under relatively low temperature, and particularly suitable for the surface treatment of various kinds of transparent or opaque plastic articles, including automotive vehicle components such as sun roofs, lens for illumination lamps, finishers, wheel covers, etc., windows for buildings, greenhouses, garages, refrigerators, display cases, etc., as well as display screens for computers or word processors.

It will be readily appreciated from the foregoing detailed description that the present invention provides an improved synthetic resin window which is light in weight and rigid enough to prevent any deformation or damages of the window as mounted in place, and which is excellent in weatherability and chemical resistance, and capable of maintaining the hard coated layer and/or frame member in good adhesion with the window body member, thereby effectively preventing separation of the hard coated layer and/or frame member from the window body member.

What is claimed is:

1. A synthetic resin window assembly for an automotive vehicle or the like, comprising;
   a window body member in the form of a sheet of transparent or semi-transparent synthetic resin having an inner surface, an outer surface and a peripheral edge of a predetermined shape;

a hard coated layer covering at least a substantial part of said outer surface of said window body member, said layer comprising a hard coated first sub-layer and a second sub-layer for tightly bonding said first sub-layer to said outer surface of window body member;

a frame member of a synthetic resin which is different from said synthetic resin of the window body member, said frame member being formed integrally with the window body member by an injection molding process to extend along said peripheral edge of the window body member, said frame member being more flexible as compared with said window body member; and a positive connection means arranged between said frame member and said outer surface of the window body member for positively connecting said frame member and said outer surface with each other, said connection means comprising a reinforcement means for providing an improved rigidity of the window assembly.

2. The synthetic resin window assembly as claimed in claim 1, wherein said peripheral edge of the window body member has an increased thickness as compared with the remaining regions of the window body member.

3. The synthetic resin window assembly as claimed in claim 1, wherein said reinforcement means includes a core element integrally connected to said window body member and at least partly embedded in said frame member.

4. The synthetic resin window assembly as claimed in claim 3, wherein said core element is secured to said frame member by an adhesive agent.

5. The synthetic resin window assembly as claimed in claim 3, wherein said core element is partly exposed from said frame member.

6. The synthetic resin window assembly as claimed in claim 3, wherein said core element is integrally connected to said window body member in a form-locking manner from outer and inner sides of said window body member.

7. The synthetic resin window assembly as claimed in claim 13, wherein said core element is formed with openings through which the synthetic resin forming said frame member is bonded to said window body member.

8. The synthetic resin window assembly as claimed in claim 3, wherein said core element has projections which are pressed into said window body member.

9. The synthetic resin window assembly as claimed in claim 1, wherein said hard coated layer has a peripheral edge on said outer surface of the window body member, said peripheral edge of the heard coated layer extending along said peripheral edge of the window body member, and wherein said frame member extends to cover a region on said peripheral edge of the hard coated layer.

10. The synthetic resin window assembly as claimed in claim 1, wherein said first sub-layer comprises a SiOx film.

11. The synthetic resin window assembly as claimed in claim 10, wherein said SiOx film is formed by a plasma-enhanced chemical vapor deposition process.

12. The synthetic resin window assembly as claimed in claim 1, wherein said second sub-layer of the hard coated layer comprises a transparent synthetic resin film which is fusion-bonded to said outer surface of said window body member.

13. The synthetic resin window assembly as claimed in claim 1, further comprising a hard coated film layer which is tightly bonded to said inner surface of the window body member.

14. The synthetic resin window assembly as claimed in claim 13, further comprising an opaque layer on said hard coated film layer on the side of the inner surface of said window body member.

* * * * *

UNITED STATES PATENT AND TRADEMARK OFFICE
CERTIFICATE OF CORRECTION

PATENT NO. : 5,339,584
DATED : August 23, 1994
INVENTOR(S) : Shinichi OHTAKE et al.

It is certified that error appears in the above-indentified patent and that said Letters Patent is hereby corrected as shown below:

Column 4, line 67, delete "a" (second occurrence).

Column 10, line 4, change "$10^{31}$ $2$" to --$10^{-2}$--.

Column 12, line 5, change "13" to --3--;
line 15, change "heard" to --hard--.

Signed and Sealed this

Twentieth Day of December, 1994

Attest:

BRUCE LEHMAN

Attesting Officer    Commissioner of Patents and Trademarks